(12) United States Patent
Uchimoto et al.

(10) Patent No.: US 7,830,131 B2
(45) Date of Patent: Nov. 9, 2010

(54) CONTROL CIRCUIT FOR SWITCHING REGULATOR

(75) Inventors: Daisuke Uchimoto, Kyoto (JP); Manabu Oyama, Kyoto (JP)

(73) Assignee: Rohm Co., Ltd. (JP)

( * ) Notice: Subject to any disclaimer, the term of this patent is extended or adjusted under 35 U.S.C. 154(b) by 184 days.

(21) Appl. No.: 11/954,350

(22) Filed: Dec. 12, 2007

(65) Prior Publication Data

US 2008/0136389 A1  Jun. 12, 2008

(30) Foreign Application Priority Data

Dec. 12, 2006  (JP) .............................. 2006-334914

(51) Int. Cl.
G05F 1/00  (2006.01)
(52) U.S. Cl. .................................................... 323/282
(58) Field of Classification Search ................ 323/222, 323/223, 229, 232, 247, 282
See application file for complete search history.

(56) References Cited

U.S. PATENT DOCUMENTS

| | | | | |
|---|---|---|---|---|
| 5,994,885 A | * | 11/1999 | Wilcox et al. | 323/285 |
| 6,304,066 B1 | * | 10/2001 | Wilcox et al. | 323/282 |
| 6,570,368 B2 | * | 5/2003 | Demizu | 323/282 |
| 7,180,274 B2 | * | 2/2007 | Chen et al. | 323/222 |
| 7,382,114 B2 | * | 6/2008 | Groom | 323/271 |
| 7,436,162 B2 | * | 10/2008 | Walters | 323/285 |
| 7,456,623 B2 | * | 11/2008 | Hasegawa et al. | 323/285 |
| 7,605,573 B2 | * | 10/2009 | Nishida | 323/282 |
| 2007/0182390 A1 | * | 8/2007 | Ishii et al. | 323/282 |
| 2007/0200540 A1 | * | 8/2007 | Hashimoto et al. | 323/282 |
| 2008/0136389 A1 | * | 6/2008 | Uchimoto et al. | 323/282 |

FOREIGN PATENT DOCUMENTS

| | | | |
|---|---|---|---|
| JP | 2000-50626 A | | 2/2000 |
| JP | 2000050625 A | * | 2/2000 |

\* cited by examiner

*Primary Examiner*—Adolf Berhane
*Assistant Examiner*—Yemane Mehari
(74) *Attorney, Agent, or Firm*—Cantor Colburn LLP

(57) ABSTRACT

A minimum pulse signal generating circuit generates a minimum pulse signal having a predetermined minimum duty ratio, synchronously with a PWM signal. When the duty ratio of the PWM signal is smaller than the minimum duty ratio, a corrected pulse signal generating circuit fixes the logical level of the PWM signal to the level that turns off a switching transistor. A driver circuit drives the switching transistor according to a corrected PWM signal output from the corrected pulse signal generating circuit. In a case in which the level of the PWM signal is fixed by means of the corrected pulse signal generating circuit, a stop signal generating circuit generates a stop signal at a predetermined first level. When the stop signal is at the predetermined first level, at least an oscillator used for pulse modulation is stopped.

7 Claims, 4 Drawing Sheets

300

CONTROL CIRCUIT FOR SWITCHING REGULATOR

BACKGROUND OF THE INVENTION

1. Field of the Invention

The present invention relates to a switching regulator, and particularly to a switching regulator with improved low power consumption.

2. Description of the Related Art

In recent years, information terminals such as cellular phones, PDAs (Personal Digital Assistants), etc., have employed devices that require higher voltage than the battery output voltage and/or devices that require lower voltage than the battery output voltage. In such cases, i.e., in a case in which the required voltage is higher than or lower than the battery voltage, a switching regulator is employed that steps up or steps down the battery voltage and thereby creates a suitable voltage to be supplied to each device.

The pulse width modulation method is widely employed as a method employed in a control circuit for controlling ON/OFF switching of a switching device element of a switching regulator. In the pulse width modulation method, a comparison is made between the output voltage of the switching regulator and a reference voltage which is a target value, and the pulse width of the driving signal is adjusted such that the error voltage thereof exhibits the minimum value. With the pulse width modulation method, the ON time ratio during which the switching device element is ON, i.e., the duty ratio, is adjusted so as to control the step-up ratio according to the battery voltage, thereby maintaining the output voltage at a constant voltage.

There is a great demand for such a switching regulator having improved conversion efficiency in the light-load state in which a low load current is applied. A technique in which the switching operation is stopped in the light-load state, thereby reducing the power consumption (electric current consumption), is disclosed in the Patent document.

[Patent Document 1]
  Japanese Patent Application Laid Open No. 2000-50626

SUMMARY OF THE INVENTION

The present invention has been made in view of the aforementioned situation. Accordingly, it is a general purpose of the present invention to provide a switching regulator with improved efficiency in the light-load state.

An embodiment of the present invention provides a control circuit for a switching regulator having a switching transistor. The control circuit comprises: a pulse modulator which generates a pulse signal having a duty ratio adjusted such that the output voltage of the switching regulator matches a predetermined reference voltage; a minimum pulse signal generating circuit which generates a minimum pulse signal which is output synchronously with the pulse signal, and which has a predetermined minimum duty ratio; a corrected pulse signal generating circuit which receives the pulse signal and the minimum pulse signal, and is configured such that, in a case in which the duty ratio of the pulse signal is smaller than the minimum duty ratio, the logical level of the pulse signal is fixed to the level that turns off the switching transistor, thereby generating a corrected pulse signal; a driver circuit which drives the switching transistor according to the corrected pulse signal output from the corrected pulse signal generating circuit; and a stop signal generating circuit configured such that, when the level of the pulse signal is fixed by means of the corrected pulse signal generating circuit, a stop signal is generated at a predetermined first level. With such an arrangement, when the stop signal is in the first predetermined level, at least an oscillator used for pulse modulation is stopped.

With such an embodiment, when the control circuit enters the light-load state, which reduces the duty ratio of the pulse signal to a value smaller than the minimum duty ratio, the switching operation is stopped, and the control circuit transits to the intermittent switching operation mode. During a period of time in which the switching operation of the switching transistor is stopped in this intermittent switching operation mode, the oscillator is also stopped, in addition to switching transistor. This further reduces power consumption, thereby improving the efficiency of the control circuit.

Also, the control circuit may further comprise a release signal generating circuit configured such that, when the duty ratio of the pulse signal determined according to the output voltage exceeds the minimum duty ratio, a release signal is output at a predetermined second level. With such an arrangement, when the release signal transits to the predetermined second level, the stop signal generating circuit may switch the stop signal to the level that is complementary to the first predetermined level.

After the switching operation of the switching transistor stops, the output voltage gradually decreases. Accordingly, the duty ratio of the pulse signal increases, and exceeds the minimum duty ratio at a certain point in time. The switching operation is restarted at the point in time at which the duty ratio of the pulse signal exceeds the minimum duty ratio.

It should be noted that, when the duty ratio of the pulse signal is compared with the minimum duty ratio, the oscillator included in the pulse modulator is stopped. Accordingly, in this stage, these pulse signals are not actually generated. In practice, the anticipated duty ratios of these pulse signals to be generated are acquired, and the duty ratio comparison should be indirectly made between the duty ratios thus acquired.

Also, when the stop signal is at the level that is complementary to the predetermined first level, the release signal generating circuit may be stopped.

There is no need to generate the release signal during a period of time in which the switching operation of the switching transistor is performed. Accordingly, in this period, the release signal generating circuit is stopped, thereby further reducing power consumption.

Also, the pulse modulator may include: an error amplifier which amplifies the deviation between a voltage that corresponds to the output voltage and a predetermined reference voltage; an oscillator which generates a triangle wave or sawtooth wave cyclic voltage having a predetermined frequency; and a modulation comparator which compares an error voltage output from the error amplifier with the cyclic voltage output from the oscillator so as to generate the pulse signal. Also, the minimum pulse signal generating circuit may include a minimum pulse signal comparator which compares the cyclic voltage output from the oscillator with a predetermined minimum voltage. Also, the release signal generating circuit may include a release comparator which compares the error voltage with the predetermined minimum voltage.

Such an arrangement is capable of appropriately detecting whether or not the duty ratio of the pulse signal becomes greater than the minimum duty ratio by comparing the error voltage with the minimum voltage without generating the pulse signals.

Also, when the stop signal is at the predetermined first level, the control circuit may also stop the modulation comparator and the minimum pulse signal comparator in addition to the oscillator.

During a period in which the switching operation is stopped, there is no need to generate the pulse signal and the minimum pulse signal. With such an arrangement, in this period, the modulation comparator and the minimum pulse signal comparator are turned off, thereby further reducing power consumption.

Also, the corrected pulse signal generating circuit may include: a first D flip-flop which receives the pulse signal via the input terminal, and which receives the minimum pulse signal via the clock terminal; and a logic gate which receives the output signal of the first D flip-flop and the pulse signal in order to perform a predetermined logic computation. With such an arrangement, the corrected pulse signal generating circuit may output as the corrected pulse signal a signal that corresponds to the output of the logic gate.

Also, the stop signal generating circuit may include a second D flip-flop with the input terminal fixed at a predetermined level, and with the clock terminal receiving the output signal of the first D flip-flop, and with the reset terminal receiving a signal that corresponds to the release signal. Also, the stop signal generating circuit may output a signal that corresponds to the second D flip-flop as the aforementioned stop signal.

Another embodiment of the present invention also relates to a control circuit for a switching regulator, which controls the ON/OFF state of a switching transistor. The control circuit comprises: a pulse modulator which generates a pulse signal having a duty ratio adjusted such that the output voltage of the switching regulator matches a predetermined reference voltage; a pulse correction circuit configured such that, in a case in which the duty ratio of the pulse signal is smaller than a predetermined minimum duty ratio, the logical level of the pulse signal is fixed to the level that turns off the switching transistor; and a driver circuit which drives the switching transistor according to the pulse signal. With such an arrangement, in a case in which the level of the pulse signal has been fixed to the fixed value by means of the pulse correction circuit, at least an oscillator used for pulse modulation is stopped.

With such an embodiment, during a period in which the switching operation is stopped in the light-load state, the oscillator is stopped, in addition to the switching transistor. This further reduces power consumption, thereby improving the efficiency of the control circuit.

Also, the control circuit may be monolithically integrated on a single semiconductor substrate. Examples of arrangements monolithically integrated include: an arrangement in which all the components of a circuit are formed on a semiconductor substrate; and an arrangement in which principal components of a circuit are monolithically integrated. With such an arrangement, a part of the resistors, capacitors, and so forth, for adjusting circuit constants, may be provided in the form of components external to the semiconductor substrate. The control circuit thus monolithically integrated has the advantage of reducing the circuit area.

Yet another embodiment of the present invention relates to a power supply apparatus. The power supply apparatus comprises: an output circuit including an inductor and a capacitor; and the above-described control circuit which drives a switching transistor connected to the inductor.

Such an embodiment reduces the power consumption of the control circuit, thereby improving the overall efficiency of the power supply apparatus.

Yet another embodiment of the present invention relates to an electronic apparatus. The electronic apparatus comprises: a battery; the above-described power supply apparatus which outputs a stable voltage using the voltage of the battery; and a load to be driven using the output voltage of the power supply apparatus.

With such an embodiment, the power consumption of the power supply apparatus is reduced when the current flowing through the load decreases. This extends the life of the battery.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

Figure 1:
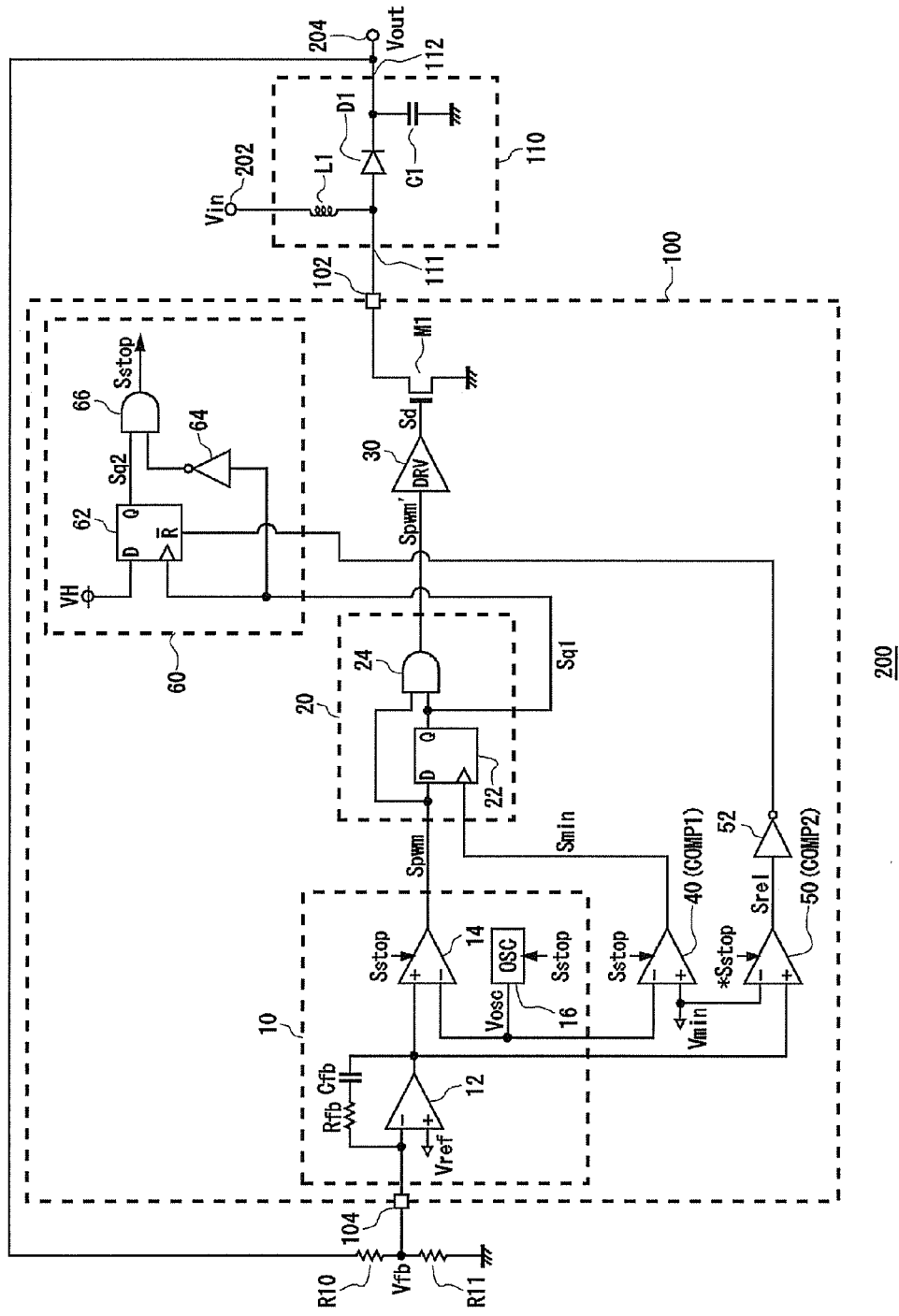
FIG. 1 is a diagram which shows a configuration of a power supply apparatus according to an embodiment of the present invention.

FIG. 1 shows a configuration of a power supply apparatus 200 according to an embodiment of the present invention. The power supply apparatus 200 according to the present embodiment is a step-up switching regulator, and has a configuration including two blocks, i.e., a control circuit 100 and a switching regulator output circuit 110 (which will simply be referred to as the "output circuit 110" hereafter). The power supply apparatus 200 includes an input terminal 202 and an output terminal 204. The voltage applied to the input terminal 202 will be referred to as "input voltage Vin", and the voltage output from the output terminal 204 will be referred to as "output voltage Vout". The input voltage Vin is provided in the form of a battery voltage output from a battery (not shown), for example. The power supply apparatus 200 steps up the input voltage Vin such that the output voltage Vout approaches the target value.

Figure 2:
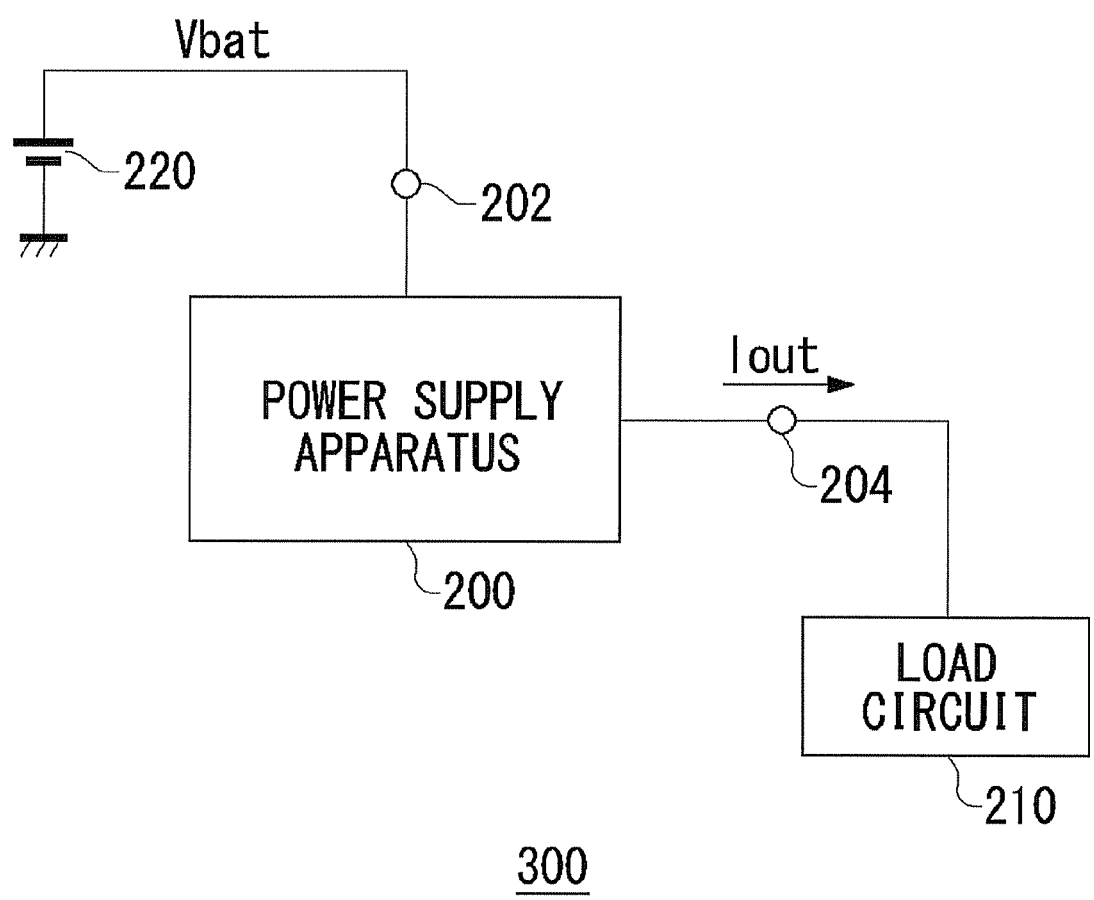
FIG. 2 is a block diagram which shows a configuration of an electronic apparatus mounting the power supply apparatus shown in FIG. 1 or FIG. 4.

FIG. 2 is a block diagram which shows a configuration of an electronic apparatus 300 mounting the power supply apparatus shown in FIG. 1 or a power supply apparatus shown in FIG. 4 described later. The electronic apparatus 300 is a small-size battery-driven information terminal such as a cellular phone terminal, digital camera, portable gaming apparatus, etc. The electronic apparatus 300 includes the power supply apparatus 200, a load circuit 210, and a battery 220.

The battery 220 is provided in the form of a lithium ion battery, which outputs the battery voltage Vbat of around 3 V to 4 V to the input terminal 202 of the power supply apparatus 200.

The load circuit 210 is provided in the form of an LSI such as a CPU which integrally controls the overall operation of the electronic apparatus 300, or an LED (Light Emitting Diode), which operates at a predetermined power supply voltage. The power supply terminal of the load circuit 210 is connected as a load to the output terminal 204 of the power supply apparatus 200, and supplies the output voltage Vout of the power supply apparatus 200 as the power supply voltage. Detailed description will be made below regarding the configuration of the power supply apparatus 200.

Description will be made returning to FIG. 1. The output circuit 110 includes a first terminal 111, a second terminal 112, a rectifier diode D1, an output inductor L1, and an output capacitor C1. One terminal of the output inductor L1 is connected to the input terminal 202, and the other terminal is connected to the first terminal 111. The anode of the rectifier diode D1 is connected to the first terminal 111, and the cathode thereof is connected to the second terminal 112. The output capacitor C1 is provided between the second terminal 112 and the grounded terminal. The first terminal 111 is connected to a switching terminal 102 of the control circuit 100. The second terminal 112 is connected to the output terminal 204.

It should be noted that the topology of the output circuit 110 is not restricted to such an arrangement shown in FIG. 1. Also, a modification may be made as appropriate according to the type of power supply apparatus, such as step-down switching regulators, insulated-type switching power supplies using a transformer, DC/AC inverters, or capacitor charger circuits.

The control circuit 100 includes the switching terminal 102 and a feedback terminal 104. The feedback terminal 104 receives the feedback voltage Vfb obtained by dividing the output voltage Vout at the output terminal 204 by means of a first feedback resistor R10 and a second feedback resistor R11.

The control circuit 100 includes a pulse width modulator 10, a correction pulse signal generating circuit (pulse correction circuit) 20, a driver circuit 30, a minimum pulse signal generating circuit 40, a release signal generating circuit 50, a stop signal generating circuit 60, and a switching transistor M1. The control circuit 100 is preferably integrated in the form of a single semiconductor chip. With such an arrangement, the switching transistor M1 may be provided to the control circuit 100 in the form of an external component.

The switching transistor M1 is an N-channel MOSFET, and serves as a switching device element having a function of switching the ON/OFF state according to the pulse-modulated driving signal Sd applied to the gate thereof. The source of the switching transistor M1 is grounded, and the drain thereof is connected to the first terminal 111 of the output circuit 110 via the switching terminal 102.

With regard to the output circuit 110, when the switching transistor M1 is in the ON state, a current flows from the input terminal 202 via the output inductor L1 and the switching transistor M1, thereby storing energy in the output inductor L1. On the other hand, when the switching transistor M1 is in the OFF state, the inductor L1 provides an inductance action to maintain the current flow as it is during the ON state of the switching transistor M1. Such a current flows via the rectifier diode D1. In this stage, the output capacitor C1 is charged due to the current flowing via the rectifier diode D1.

With such an arrangement, the switching transistor M1 is repeatedly switched ON/OFF, thereby providing energy conversion between the inductor L1 and the output capacitor C1. Thus, the input voltage Vin is stepped up, and the input voltage thus stepped up is smoothed by the output capacitor C1, thereby outputting the voltage thus smoothed as the output voltage Vout.

With regard to the control circuit 100, the driving signal is supplied to the gate, i.e., the control terminal of the switching transistor M1, thereby controlling the switching operation thereof. With the present embodiment, the switching transistor M1 is provided to the control circuit 100 in the form of a built-in component. Also, the switching transistor M1 may be provided to the control circuit 100 in the form of an external component.

The driving signal Sd is a pulse width modulation signal alternately switched between the high-level state and the low-level state. The ON/OFF time of the switching transistor M1 is controlled according to the low-level period and the high-level period of the driving signal Sd, thereby adjusting the output voltage Vout. The pulse width modulator 10 receives the feedback voltage Vfb. The pulse width modulator 10 generates a pulse width modulated signal (which will be referred to as the "PWM signal" hereafter) with a duty ratio adjusted such that the feedback voltage Vfb matches a predetermined reference voltage Vref.

The pulse width modulator 10 includes an error amplifier 12, a PWM comparator 14, and an oscillator 16. The feedback voltage Vfb, which is proportional to the output voltage Vout, is input to the inverting input terminal of the error amplifier 12, and the predetermined reference voltage Vref is input to the non-inverting input terminal thereof. The error amplifier 12 amplifies the deviation between the feedback voltage Vfb and the reference voltage Vref. The error amplifier 12 provides a feedback action to maintain the deviation between the feedback voltage Vfb and the reference voltage Vref at 0 V, i.e., generates the error voltage Verr. A feedback resistor Rfb and a feedback capacitor Cfb are serially connected between the output terminal and the inverting input terminal of the error amplifier 12. The feedback resistor Rfb and the feedback capacitor Cfb may be provided to the control circuit 100 in the form of external components.

The oscillator 16 generates a triangle wave or sawtooth (ramp) wave cyclic voltage Vosc having a predetermined frequency. The error voltage Verr output from the error amplifier 12 is input to the inverting input terminal of the PWM comparator 14, and the cyclic voltage Vosc output from the oscillator 16 is input to the non-inverting input terminal of the PWM comparator 14. With such an arrangement, when the error voltage Verr is greater than the cyclic voltage Vosc, the PWM comparator 14 generates the PWM signal Spwm in the high-level state. On the other hand, when the error voltage Verr is smaller than the cyclic voltage Vosc, the PWM comparator 14 generates the PWM signal Spwm in the low-level state. The duty ratio of the PWM signal Spwm is determined according to the error voltage Verr. The PWM signal Spwm is a pulse signal which determines the ON-time of the switching transistor M1. With such an arrangement, the duty ratio is adjusted such that the output voltage Vout of the power supply apparatus 200 matches the predetermined reference voltage. With the present embodiment, the high-level state of the PWM signal Spwm corresponds to the ON-state of the switching transistor M1, and the low-level state of the PWM signal Spwm corresponds to the OFF-state of the switching transistor M1.

The minimum pulse signal generating circuit 40 generates a minimum pulse signal Smin. The minimum pulse signal Smin is generated synchronously with the PWM signal Spwm, and has a predetermined minimum duty ratio Dmin. For example, the setting of the minimum duty ratio Dmin is on the order of 30%. The minimum pulse signal generating circuit 40 according to the present embodiment includes a minimum pulse signal comparator COMP1. With such an arrangement, the cyclic voltage Vosc output from the oscillator 16 is input to the non-inverting terminal of the minimum pulse signal comparator COMP1, and a predetermined minimum voltage Vmin is input to the non-inverting input terminal thereof. The minimum pulse signal comparator COMP1 compares the cyclic voltage Vosc with the minimum voltage Vmin. When the minimum voltage is greater than the cyclic voltage Vosc, the minimum pulse signal comparator COMP1 outputs the minimum pulse signal Smin in the high-level state. On the other hand, when the minimum voltage is smaller than the cyclic voltage Vosc, the minimum pulse signal comparator COMP1 outputs the minimum pulse signal Smin in the low-level state.

The corrected pulse signal generating circuit 20 receives the PWM signal Spwm and the minimum pulse signal Smin. When the duty ratio Dpwm of the PWM signal Spwm is smaller than the minimum duty ratio Dmin, the corrected pulse signal generating circuit 20 fixes the logic level of the PWM signal Spwm to the level that turns off the switching transistor M1, i.e., to the low-level state. The output signal of the corrected pulse signal generating circuit 20 will be referred to as the "corrected PWM signal Spwm'" hereafter.

The corrected pulse signal generating circuit 20 includes a first D flip-flop 22 and a first AND gate 24. With regard to the first D flip-flop 22, the PWM signal Spwm is input to the input terminal thereof, and the minimum pulse signal Smin is input to the clock terminal thereof. The first AND gate 24 receives the output signal Sq1 of the first D flip-flop 22 and the PWM signal Spwm, and executes a predetermined logic computation, i.e., a logical-sum (AND) computation, thereby outputting the corrected PWM signal Spwm'.

The first D flip-flop 22 retains the logic level of the PWM signal Spwm at the timing when the positive edge of the minimum pulse signal Smin is input to the clock terminal, and outputs the signal at the logic level thus retained. When the Dpwm is greater than the Dmin, the PWM signal Spwm is in the high-level state at the timing when the positive edge of the minimum pulse signal Smin is input, and accordingly, the output signal Sq1 of the first D flip-flop 22 is in the high-level state. Accordingly, when the Dpwm is greater than the Dmin, the first AND gate 24 outputs the PWM signal Spwm as it is.

On the other hand, when the Dpwm is smaller than the Dmin, the PWM signal Spwm is in the low-level state at the timing when the positive edge of the minimum pulse signal Smin is input, and accordingly, the output signal Sq1 of the first D flip-flop 22 is in the low-level state. Accordingly, when the Dpwm is smaller than the Dmin, the first AND gate 24 fixes the PWM signal Spwm to the low-level state so as to turn off the switching transistor M1.

The release signal generating circuit 50 detects whether or not the duty ratio Dpwm of the PWM signal Spwm determined according to the output voltage Vout exceeds the minimum duty ratio Dmin. When the Dpwm exceeds the Dmin, the release signal generating circuit 50 outputs a release signal Srel at a second predetermined level (let us say the second predetermined level is the high level).

The release signal generating circuit 50 according to the present embodiment includes a release comparator COMP2 which compares the error voltage Verr with the minimum voltage Vmin. When the Dpwm is greater than the Dmin, the release signal Srel output from the release comparator COMP2 is in the high-level state. On the other hand, when the Dpwm is smaller than the Dmin, the release signal Srel is in the low-level state. The release signal Srel is inverted by the first inverter 52, and is input to the stop signal generating circuit 60.

The driver circuit 30 generates a driving signal Sd, which is to be supplied to the gate, i.e., the control terminal of the switching transistor M1, according to the corrected PWM signal Spwm' output from the corrected pulse signal generating circuit 20. The driver circuit 30 includes an inverter of a size sufficient to drive the switching transistor M1 having certain gate capacity.

During a period from the point in time at which the corrected PWM signal Spwm' is fixed to the low-level state by the corrected pulse signal generating circuit 20 up to the point in time at which the release signal Srel transits to a second predetermined level state (high-level state), the stop signal generating circuit 60 generates a stop signal Sstop at a predetermined first level (high level).

The stop signal generating circuit 60 according to the present embodiment includes a second D flip-flop 62, a second inverter 64, and a second AND gate 66.

The input terminal of the second D flip-flop 62 is fixed to the high-level VH. The clock terminal of the second D flip-flop 62 receives the output signal Sq1 of the first D flip-flop 22, which is the output signal generated by the corrected pulse signal generating circuit 20. The inverting reset terminal receives the signal *Srel, which is the inverted signal of the release signal Srel. Here, the symbol "*" indicates that the signal is logically inverted.

The second inverter 64 inverts the output signal Sq1 of the first D flip-flop 22. The second AND gate 66 outputs the logical sum of the inverted output signal Sq1 and the output signal Sq2 of the second D flip-flop 62 as the stop signal Sstop.

The stop signal Sstop is used for stopping the circuit blocks included in the control circuit 100. With the present embodiment, when the stop signal Sstop is in the first predetermined level state (high-level state), the operations of the pulse width modulator 10 and the minimum pulse signal generating circuit 40 are stopped.

The operations of these circuits are stopped by stopping the supply of the current or voltage to the device elements included in the circuits, thereby reducing the power consumption in the circuits. In particular, stopping the oscillator 16 is greatly effective in reducing the current consumption (power consumption), for example. Also, the PWM comparator 14 and the minimum pulse signal generating circuit 40 are stopped during a period of time in which there is no need to generate the PWM signal Spwm and the minimum pulse signal Smin, thereby reducing the current consumption.

It should be noted that the error voltage Verr output from the error amplifier 12 of the pulse width modulator 10 is used by the release signal generating circuit 50 for generating the release signal Srel. Accordingly, the error amplifier 12 preferably operates without such a period in which its operations are stopped.

Furthermore, with the present embodiment, when the stop signal Sstop is in the level state (low-level state) that is complementary to the predetermined first level state (high-level state), the release signal generating circuit 50 is stopped. Specifically, the current supply to the release comparator COMP2 should be stopped.

Description will be made regarding the operation of the control circuit 100 having the above-described configuration.

When a large current (which will be referred to as the "large load current" hereafter) is applied to a load (not shown)

connected to the output terminal 204, the duty ratio Dpwm of the PWM signal Spwm is maintained at Dpwm=Vin/Vout in a stable manner. In this case, the duty ratio Dpwm is greater than the minimum duty ratio Dmin, and accordingly, the corrected PWM signal Spwm' is the same as the PWM signal Spwm, whereupon the ordinary pulse-with modulation step-up operation is performed.

Figure 3:
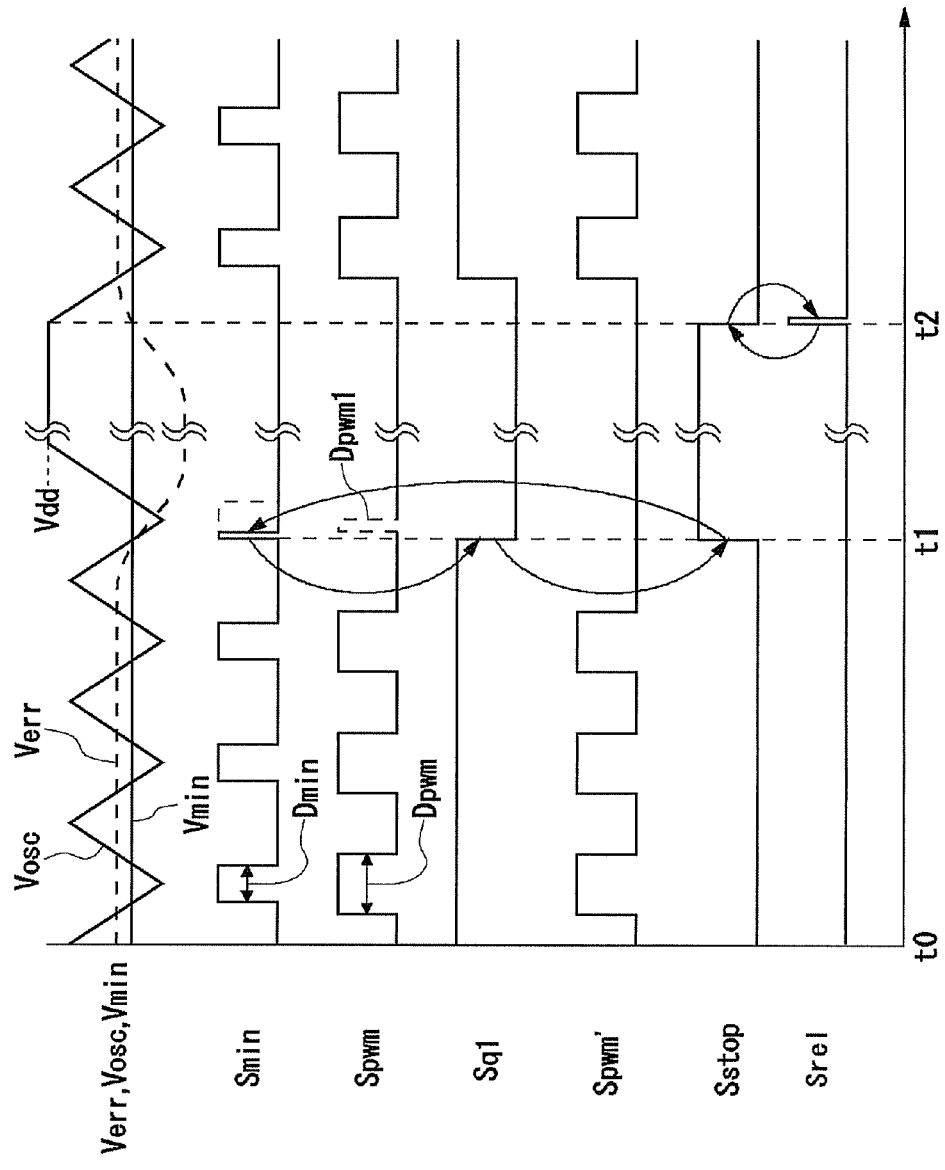
FIG. 3 is a timechart which shows the operating state of the control circuit shown in FIG. 1 in the light-load state.

Next, description will be made regarding the light-load state in which a low load current is applied. FIG. 3 is a timechart which shows the operating state of the control circuit 100 shown in FIG. 1 when a low load is applied. In FIG. 3, the vertical axis and the horizontal axis have been expanded or reduced in order to facilitate understanding as appropriate. Furthermore, each waveform has been simplified to facilitate understanding.

In a case in which a load current is reduced, the current flowing from the output capacitor C1 to a load (not shown) is reduced. In this case, sufficient charge of the output capacitor C1 requires only a short ON-time of the switching transistor M1, thereby increasing the output voltage Vout.

Let us say that the stop signal SStop is in the low-level state at the point in time t0. In this stage, the pulse width modulator 10 is in the active state. In this state, the PWM signal generated by the pulse width modulator is in the high-level state when the Verr is greater than the Vosc. Furthermore, the minimum pulse signal generating circuit 40 is in the active state. In this state, the minimum pulse signal generating circuit 40 generates the minimum pulse signal Smin, which is in the high-level state when the Verr is greater than the Vosc.

During a certain period of time from the point in time t0, the Dpwm is greater than the Dmin. Accordingly, the PWM signal Spwm is in the high-level state at the timing when the positive edge of the minimum pulse signal Smin is input. Accordingly, the output signal Sq1 of the first D flip-flop 22 of the corrected pulse signal generating circuit 20 is maintained at the high level. During this period, the corrected PWM signal Spwm' output from the corrected pulse signal generating circuit 20 exhibits the same logical value as that of the PWM signal Spwm.

In a case in which the switching ON/OFF of the switching transistor M1 is controlled according to the PWM signal Spwm in the light-load state, the output voltage Vout increases beyond the target value. As a result, the error voltage Verr output from the error amplifier 12 decreases.

As the error voltage Verr decreases, the duty ratio of the PWM signal Spwm (Dpwm1 shown in FIG. 3) becomes smaller than the minimum duty ratio Dmin. As a result, the PWM signal Spwm is in the low-level state at the point in time t1 when the positive edge of the minimum pulse signal Smin is input. In this stage, the first D flip-flop 22 detects that the Dpwm has fallen below the Dmin, whereupon the output signal Sq1 transits to the low-level state. When the output voltage Sq1 is in the low-level state, the corrected PWM signal Spwm' is fixed to the low-level state by means of the first AND gate 24. With the control circuit 100 according to the present embodiment, when the corrected PWM signal Spwm' is fixed to the low-level state, the switching operation of the switching transistor M1 is stopped. In this state, there is no need to apply the current for charging and discharging the gate capacitor of the switching transistor M1, thereby reducing the current consumption.

When the output signal Sq1 of the first D flip-flop 22 transits to the low-level state, the stop signal generating circuit 60 switches the stop signal Sstop to the high-level state. The switching of the stop signal Sstop to the high-level state stops the oscillator 16. Specifically, let us consider an arrangement in which the oscillator 16 includes an unshown capacitor, and the capacitor is alternately charged and discharged repeatedly so as to generate the cyclic voltage Vosc. With such an arrangement, the switching operation for charging/discharging the capacitor is stopped, thereby stopping the oscillator. With the present embodiment, the capacitor is stopped in the charge state. Accordingly, the cyclic voltage increases up to the power supply voltage Vdd, and is maintained at the power supply voltage Vdd. With such an arrangement, the charging/discharging operation of the capacitor is stopped, thereby reducing the current consumption of the oscillator 16. This further reduces the current consumption of the control circuit 100 in the light-load state.

In a case in which the stop signal Sstop is in the high-level state, the PWM comparator 14 is stopped. Furthermore, the minimum pulse signal comparator COMP1 is stopped. Accordingly, in this state, the PWM signal Spwm indicated by the broken line is not actually generated. Furthermore, the minimum pulse signal Smin transits to the low-level state immediately after the stop signal Sstop becomes the high-level state. With such an arrangement, in this state, the operations of the PWM comparator 14 and the minimum pulse signal comparator COMP1 are stopped, thereby further reducing the current consumption.

When the switching operation of the switching transistor M1 stops, the charging of the output capacitor C1 also stops. Accordingly, the output voltage Vout gradually decreases due to the discharge of the output capacitor C1 which supplies current to the load. As the output voltage Vout decreases, the error voltage Verr increases.

When the Verr becomes greater than Vmin at the point in time t2, the release signal Srel is switched to the high-level state by means of the release comparator COMP2 of the release signal generating circuit 50. The release signal generating circuit 50 detects whether or not the Verr is greater than the Vmin, thereby indirectly detecting that the Dpwm is greater than the Dmin. When the release signal Srel is switched to the high-level state, the second D flip-flop 62 of the stop signal generating circuit 60 is reset, thereby switching the stop signal Sstop to the low-level state. When the stop signal Sstop is switched to the low-level state, the PWM comparator 14, the oscillator 16, and the minimum pulse signal generating circuit 40 are switched to the operating state. When the oscillator 16 is restarted, the voltage, which was fixed to the power supply voltage Vdd, decreases due to the discharging operation, following which the Vosc is supplied in the form of a triangle wave cyclic voltage. Accordingly, the generation of the PWM signal Spwm and the minimum pulse signal Smin is thus resumed.

When the stop signal Sstop is switched to the low-level state at the point in time t2, the release comparator COMP2 of the release signal generating circuit 50 is switched to the suspended state. This further reduces the current consumption. It should be noted that, immediately after the release comparator COMP2 is switched to the suspended state at the point in time t2, the release signal Srel is switched to the low-level state.

In a case in which the light-load state is maintained after the point in time t2, the state is returned to that at the point in time t0, and the above-described operation is repeatedly performed. As a result, the state in which the switching operation of the switching transistor M1 is performed and the state in which the switching operation thereof is stopped are alternately performed repeatedly, thereby reducing the current consumption. With the control circuit 100, the switching state and the suspended state can be indicated by the signal level of the stop signal Sstop. With such an arrangement, unnecessary operation of the circuits is stopped using the stop signal Sstop, thereby further reducing the current consumption.

The embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present invention.

The settings of the logical values of the signals, such as the high-level state and the low-level state of the signals, have been described in the present embodiment for exemplary purposes only. The settings can be freely modified by inverting the signals using inverters or the like. For example, description has been made regarding an arrangement in which a D flip-flop is employed in the corrected pulse signal generating circuit 20 and the stop signal generating circuit 60. Also, the D flip-flop thus employed may be replaced by other circuits having the same function, such as latch circuits, flip-flop circuits, etc., which will be readily understand by those skilled in this art. Such an arrangement is also encompassed by the technical scope of the present invention.

Description has been made in the embodiment regarding an arrangement in which the power supply apparatus 200 is a step-up switching regulator. The present invention is not restricted to such an arrangement. Also, the present invention is applicable to step-down switching regulators and switching power supplies using a transformer instead of an inductor. The present invention is not restricted to a power supply apparatus employing the diode rectification method. Also, the present invention is applicable to a power supply apparatus 200 employing the synchronous rectification method.

Figure 4:
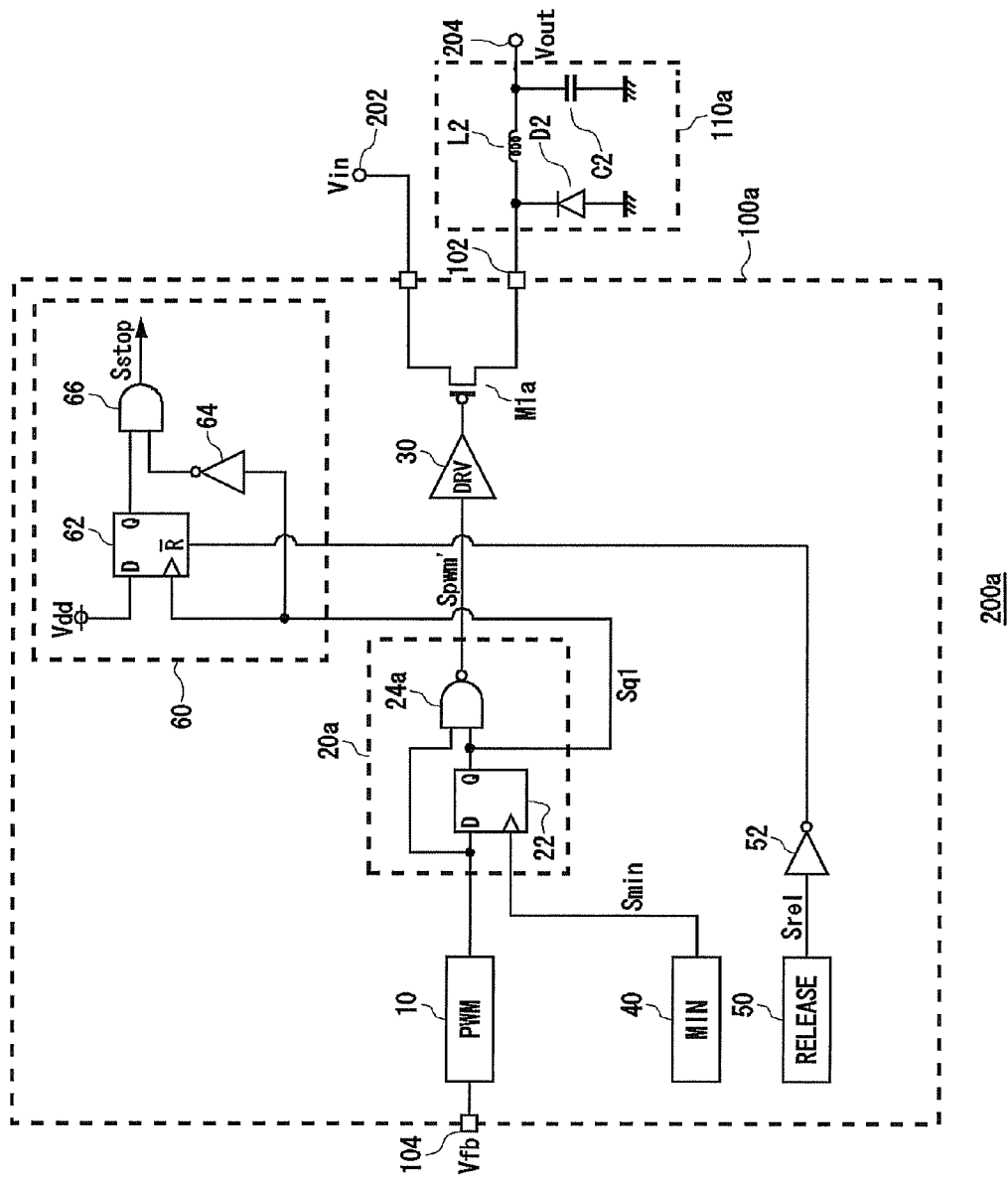
FIG. 4 is a circuit diagram which shows a part of a configuration of a power supply apparatus according to a modification.

FIG. 4 is a circuit diagram which shows a part of a configuration of a power supply apparatus 200a according to a modification. In this modification, the power supply apparatus 200a shown in FIG. 4 is a step-down switching regulator. It should be noted that the same components as those shown in FIG. 1 are simplified or omitted. The step-down switching regulator includes an output circuit 110a having a topology that differs from that shown in FIG. 1. The output circuit 110a includes a rectifier diode D2, an output inductor L2, and an output capacitor C2. With regard to the rectifier diode D2, the anode thereof is grounded, and the cathode thereof is connected to the switching terminal 102. With regard to the output inductor L2, one terminal is connected to the switching terminal 102, and the other terminal is connected to the output terminal 204. Furthermore, with regard to the output capacitor C2, one terminal is connected to the output terminal 204, and the other terminal is grounded.

The switching transistor M1a is provided in the form of a P-channel MOSFET (or a PNP bipolar transistor). The corrected pulse signal generating circuit 20a has the same configuration except for the NAND gate 24a included instead of the first AND gate 24 shown in FIG. 1. With the power supply apparatus 200a shown in FIG. 4, in a case in which the circuit state enters the light-load state, the switching state and the suspended state are alternately performed. In this state, unnecessary operation of the circuit blocks is stopped, thereby reducing the current consumption.

While the preferred embodiments of the present invention have been described using specific terms, such description is for illustrative purposes only, and it is to be understood that changes and variations may be made without departing from the spirit or scope of the appended claims.

What is claimed is:
1. A control circuit for a switching regulator having a switching transistor comprising:

a pulse modulator which generates a modulated pulse signal having a duty ratio adjusted such that the output voltage of said switching regulator matches a predetermined reference voltage;

a minimum pulse signal generating circuit which generates a minimum pulse signal which is output synchronously with the modulated pulse signal, and which has a predetermined minimum duty ratio;

a corrected pulse signal generating circuit which receives the modulated pulse signal and the minimum pulse signal and outputs a corrected pulse signal such that the corrected pulse signal has a level that corresponds to the modulated pulse signal when the duty ratio of the modulated pulse signal is larger than the minimum duty ratio and has a level that turns off the switching transistor when the duty ratio of the modulated pulse signal is smaller than the minimum duty ratio, a driver circuit which drives said switching transistor according to the corrected pulse signal output from said corrected pulse signal generating circuit; and a stop signal generating circuit which generates a stop signal having a first predetermined level when the duty ratio of the modulated pulse signal is smaller than the minimum duty ratio;

a release signal generating circuit configured to generate, when the duty ratio of the pulse signal determined according to the output voltage exceeds the minimum duty ratio, a release signal is output at a predetermined second level, wherein, when the stop signal is in the first predetermined level, at least an oscillator used for pulse modulation is stopped; and wherein, when the release signal transits to the predetermined second level, said stop signal generating circuit switches the stop signal to the level that is complementary to the first predetermined level.

2. A control circuit according to claim 1, wherein, when the stop signal is at the level that is complementary to the predetermined first level, said release signal generating circuit is stopped.

3. A control circuit according to claim 1, wherein said pulse modulator includes:

an error amplifier which amplifies the deviation between a voltage that corresponds to the output voltage and a predetermined reference voltage;

an oscillator which generates a triangle wave or sawtooth wave cyclic voltage having a predetermined frequency; and a modulation comparator which compares an error voltage output from said error amplifier with the cyclic voltage output from said oscillator so as to generate the modulated pulse signal, and wherein said minimum pulse signal generating circuit includes a minimum pulse signal comparator which compares the cyclic voltage output from said oscillator with a predetermined minimum voltage, and wherein said release signal generating circuit includes a release comparator which compares the error voltage with the predetermined minimum voltage.

4. A control circuit according to claim 1, wherein said corrected pulse signal generating circuit includes:

a first D flip-flop which receives the modulated pulse signal via the input terminal, and which receives the minimum pulse signal via the clock terminal; and a logic gate which receives the output signal of said first D flip-flop and the modulated pulse signal in order to perform a predetermined logic computation, and wherein said corrected pulse signal generating circuit outputs as the corrected pulse signal a signal that corresponds to the output of said logic gate.

5. A control circuit according to claim 4, wherein, when the stop signal is at the predetermined first level, said control circuit also stops said modulation comparator and said minimum pulse signal comparator in addition to said oscillator.

6. A control circuit according to claim 4, wherein said stop signal generating circuit includes a second D flip-flop with the input terminal fixed at a predetermined level, and with the clock terminal receiving the output signal of said first D flip-flop, and with the reset terminal receiving a signal that corresponds to the release signal, and wherein said stop signal generating circuit outputs a signal that corresponds to said second D flip-flop as the aforementioned stop signal.

7. A control method for controlling the ON/OFF state of a switching transistor, comprising:

generating a modulated pulse signal having a duty ratio adjusted such that the output voltage of said switching regulator matches a reference voltage;

generating a minimum pulse signal which is output synchronously with the modulated pulse signal, and which has a predetermined minimum duty ratio;

generating a corrected pulse signal having a level that corresponds to the modulated pulse signal when the duty ratio of the modulated pulse signal is larger than the minimum duty ratio and having a level that turns off the switching transistor when the duty ratio of the modulated pulse signal is smaller than the minimum duty ratio;

driving said switching transistor according to the corrected pulse signal;

generating a top signal having a first predetermined level when the duty ratio of the modulated pulse signal is smaller than the minimum duty ratio;

stopping at least an oscillator used for pulse modulation when the stop signal is in the first predetermined level;

generating a release signal output at a second predetermined level when the duty ratio of the modulated pulse signal determined according to the output voltage exceeds the minimum duty ratio; and switching the stop signal to a level that is complementary to the first predetermined level when the release signal transits to the predetermined second level.

* * * * *